(12) United States Patent
Yamamoto

(10) Patent No.: US 12,502,766 B2
(45) Date of Patent: Dec. 23, 2025

(54) MANIPULATOR ARM

(71) Applicant: RIVERFIELD INC., Tokyo (JP)

(72) Inventor: Nobuaki Yamamoto, Tokyo (JP)

(73) Assignee: RIVERFIELD INC., Tokyo (JP)

( * ) Notice: Subject to any disclaimer, the term of this patent is extended or adjusted under 35 U.S.C. 154(b) by 0 days.

(21) Appl. No.: 18/971,598

(22) Filed: Dec. 6, 2024

(65) Prior Publication Data

US 2025/0091198 A1 Mar. 20, 2025

Related U.S. Application Data

(63) Continuation of application No. PCT/JP2022/023839, filed on Jun. 14, 2022.

(51) Int. Cl.
*B25J 9/10* (2006.01)

(52) U.S. Cl.
CPC .................................. B25J 9/1065 (2013.01)

(58) Field of Classification Search
CPC ................................ B25J 9/1065; B25J 18/04
See application file for complete search history.

(56) References Cited

U.S. PATENT DOCUMENTS

| | | | | |
|---|---|---|---|---|
| 5,971,677 A * | 10/1999 | Lan | ........................ | B25J 9/1065 408/237 |
| 7,618,016 B2 * | 11/2009 | Brown | .................. | G03B 17/561 248/584 |
| 11,248,738 B2 | 2/2022 | Wakasugi et al. | | |
| 2006/0186292 A1 | 8/2006 | Rutherford et al. | | |
| 2020/0206947 A1 * | 7/2020 | Smith | .................... | B25J 9/1065 |
| 2021/0059783 A1 | 3/2021 | Haraguchi et al. | | |

FOREIGN PATENT DOCUMENTS

| | | | | |
|---|---|---|---|---|
| JP | 2018-175863 A | 11/2018 | | |
| WO | WO-2020092516 A1 * | 5/2020 | ............ | B25J 9/1065 |

* cited by examiner

*Primary Examiner* — Bobby Rushing, Jr.
(74) *Attorney, Agent, or Firm* — Sughrue Mion, PLLC

(57) ABSTRACT

A manipulator arm includes a parallel link, an actuator, and first and second covers. The parallel link includes first and second end members spaced apart from each other, a first link attached to the first end member at a first position and to the second end member at a second position, and a second link attached to the first end member at a first position and attached to the second end member at a second position, the first link being parallel to the second link. The actuator is attached to the first end member at a first actuator position and attached to the second end member at a second actuator position. The first cover is on the first link and covers at least the actuator, and the second cover is on the first link and covers at least the second link and the actuator.

13 Claims, 9 Drawing Sheets

MANIPULATOR ARM

CROSS REFERENCE TO RELATED APPLICATION

This application is a continuation application of International Patent Application No. PCT/JP2022/023839 filed on Jun. 14, 2022, the contents of which being incorporated by reference herein in its entirety.

BACKGROUND

The present disclosure relates to a manipulator arm.

In recent years, surgery using a surgical assist system has been becoming popular. The surgical assist system includes manipulator arms that hold instruments to be used for surgery (hereinafter, also referred to as "surgical instruments"). Examples of the surgical instruments may include endoscopes, forceps, electric scalpels, and other instruments to be used in surgery. The manipulator arms hold the surgical instruments according to the types and circumstances of the surgery.

SUMMARY

It is an aspect to provide a manipulator arm suitable for use in a clean surgery area.

According to an aspect of one or more embodiments, there is provided a manipulator arm comprising a parallel link including a first end member and a second end member arranged to be spaced apart from each other, and a first link and a second link that are arranged to extend between the first end member and the second end member and that are arranged side by side with a space therebetween; an actuator that is arranged to extend between the first end member and the second end member and that is configured to change a longitudinal length thereof to generate a driving force to rotationally move the first end member and the second end member relative to each other, wherein a first position where the actuator is attached to the first end member is a position that sandwiches, between the first position and a position where the second link is attached, a position where the first link is attached, and wherein a second position where the actuator is attached to the second end member is a position that is a same position as a position where the second link is attached; a first cover placed on the first link from a side opposite the second link with respect to the first link, the first cover covering at least the actuator; and a second cover placed on the first link from a second link side with respect to the first link, the second cover covering at least the second link and the actuator.

According to another aspect of one or more embodiments, there is provided a manipulator arm comprising a parallel link including a first end member and a second end member spaced apart from the first end member, and a first link attached to the first end member at a first position and to the second end member at a second position, and a second link attached to the first end member at a first position and attached to the second end member at a second position, the first link being parallel to the second link; an actuator attached to the first end member at a first actuator position and attached to the second end member at a second actuator position, wherein the first position of the first link is located between the first actuator position and the first position of the second link, and wherein the second actuator position is a same position as the second position of the second link; a first cover on the first link and covering at least the actuator; and a second cover on the first link and covering at least the second link and the actuator.

According to yet another aspect of one or more embodiments, there is provided a manipulator arm comprising two parallel links, each of the two parallel links including a first end member and a second end member spaced apart from the first end member, a first link between the first end member and the second end member, and a second link between the first end member and the second end member, the first link being parallel to the second link; an actuator attached to a first actuator shaft extending through the first end members of the two parallel links and to a second actuator shaft extending through the second end members of the two parallel links; a first cover between the two parallel links and on the first links, the first cover covering at least the actuator; and a second cover between the two parallel links and on the first links, the second cover covering at least the second links and the actuator. The first links are attached to a first link shaft extending through the first end members of the two parallel links and to a second link shaft extending through the second end members of the two parallel links, the second links are attached to a third link shaft extending through the first end members of the two parallel links and to the second actuator shaft, and the first link shaft is located between the first actuator shaft and the third link shaft.

DETAILED DESCRIPTION

Figure 1:
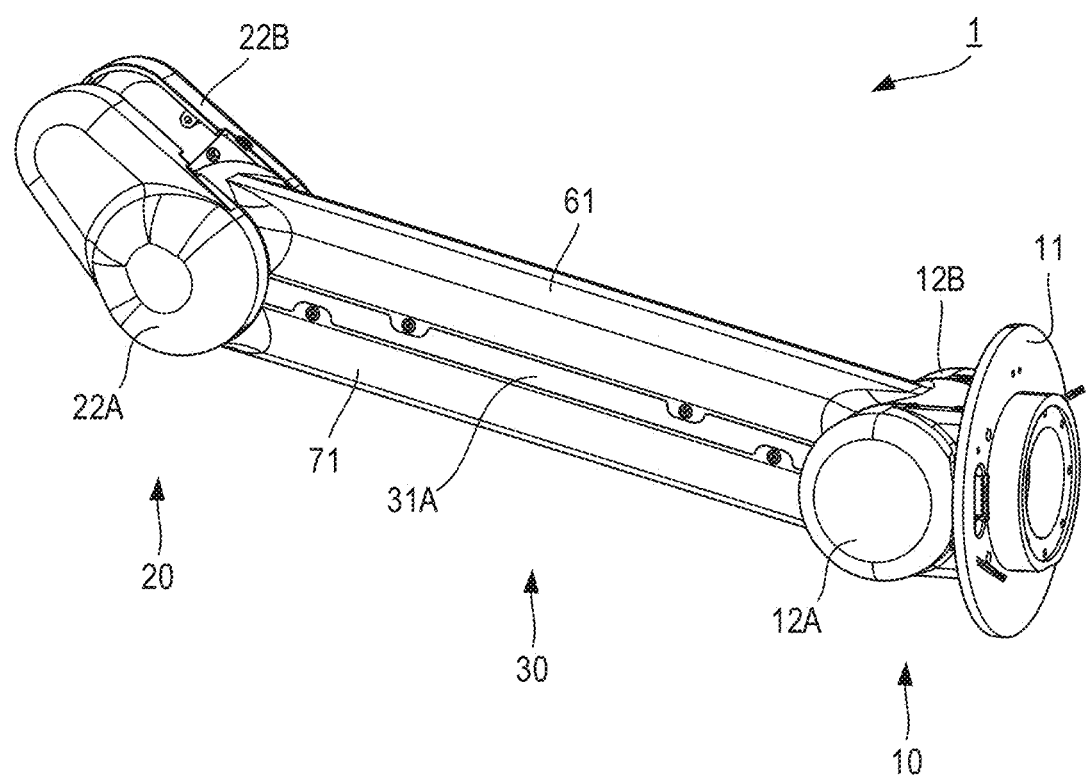
FIG. 1 is a perspective view illustrating an appearance of a manipulator arm, according to some embodiments.

As discussed above, manipulator arms hold the surgical instruments according to the types and circumstances of the surgery.

The manipulator arms have one or more link mechanisms and move the link mechanisms to thereby move the surgical instruments to desired positions and hold the surgical instruments at the positions. The link mechanisms are moved by driving forces provided by actuators mounted on the manipulator arms.

The link mechanisms used in the manipulator arms may include a four-bar linkage. Examples of the four-bar linkage may include a parallel link in which the respective lengths of opposite links are equal.

In some cases, the manipulator arm is provided with covers, and the covers surround the link mechanisms, the actuator, or the like. The covers are used to separate the interior and exterior of the manipulator arm.

In the case where the link mechanism is a parallel link, a first cover and a second cover may be respectively attached to a first link and a second link that face each other. When the parallel link moves, the first link and the second link move in relatively opposite directions. The first cover moves together with the first link equipped with the first cover, and the second cover moves together with the second link equipped with the second cover. Therefore, the parallel link of the manipulator arm can move in a state where the first cover and the second cover are attached.

On the other hand, in a state where the first cover and the second cover are in contact, when the first cover and the second cover move relative to each other, there is a possibility that foreign matter may be generated as the first cover and the second cover slide against each other. Since the manipulator arm is used in a clean surgical area, it is advantageous that no foreign matter be generated.

If a gap is provided between the first cover and the second cover, it is possible to inhibit the generation of foreign matter due to the sliding of the first cover and the second cover against each other. However, an internal space of the first cover and the second cover can be connected to the external space through the gap. In other words, the gap allows the internal space of the first cover and the second cover to be exposed to the outside of the cover.

Sliding mechanisms, such as an actuator and a parallel link, are typically arranged in the internal space of both the first cover and the second cover. There is a possibility that foreign matter may be generated in these sliding mechanisms, and the gap described above may allow the generated foreign matter to be released to the exterior of the manipulator arm. In the manipulator arm used in a clean surgery area, it is advantageous that no foreign matter be released.

Various embodiments herein are directed to a manipulator arm suitable for use in a clean surgery area.

According to some embodiments, a manipulator arm may include a parallel link provided with a first end member and a second end member arranged to be spaced apart from each other, and a first link and a second link that are arranged to extend between the first end member and the second end member and that are arranged side by side with a space therebetween, the manipulator arm may further comprise: an actuator that is arranged to extend between the first end member and the second end member and that is configured to change its longitudinal length to thereby generate a driving force to rotationally move the first end member and the second end member relative to each other, wherein a position where the actuator is attached to the first end member is a position that sandwiches, between itself and a position where the second link is attached, a position where the first link is attached, and wherein a position where the actuator is attached to the second end member is a position same as a position where the second link is attached; a first cover placed on the first link from a side opposite the second link with respect to the first link, the first cover covering at least the actuator; and a second cover placed on the first link from a second link side with respect to the first link, the second cover covering at least the second link and the actuator.

In the manipulator arm, the first cover and the second cover may be placed on the same first link, and thus, the first cover and the second cover do not slide against each other when the parallel link is moved. Here, placing the first cover and the second cover on the same first link may be understood to mean, for example, that both the first cover and the second cover are attached to the first link.

Placing the first cover and the second cover on the first link makes it less likely that a gap is formed between the first cover and the second cover. In other words, it is easy to reduce the gap. By attaching both the first cover and the second cover to the first link, even if there is a gap between the first cover and the second cover, the first link is present in the gap, and therefore, the gap can be covered by the first link.

In some embodiments, a position where the actuator is attached to the first end member may sandwich, between itself and a position where the second link is attached, a position where the first link is attached, and a position where the actuator is attached to the second end member may be the same as a position where the second link is attached. Therefore, when the parallel link moves, a movement distance of the first link is shorter than a movement distance of the second link. Thus, a movement distance of the first cover and the second cover, which are placed on the first link, is shorter than a case where, for example, the second cover is placed on the second link. That is, in comparison with the case where the second cover is placed on the second link, the movement distance of the first cover and the second cover with respect to the entire manipulator arm is shortened, and the first cover and the second cover are less likely to slide against other components of the manipulator arm.

In some embodiments, a first end of the first link may be attached at a rotation center of the first end member, and a second end of the first link may be attached at a rotation center of the second end member.

According to this structural configuration, since the first link is attached at the rotating centers of the first end member and the second end member, it is possible to easily control the movement of the first link even when the parallel link moves. In other words, even when the second link moves with the rotational movement of the first end member and the second end member, the first link moves less relative to the entire manipulator arm (in other words, the travel distance of the first link relative to the entire manipulator arm can be smaller).

In some embodiments, a first distance from the position where the first link is attached to the position where the second link is attached in the first end member may be equal to a second distance from the position where the first link is attached to the position where the actuator is attached in the first end member.

According to this structural configuration, since the first distance is equal to the second distance, the movement of the first link is easily controlled even when the parallel link is moved by the driving force of the actuator. In other words, even when the second link moves with the rotational movement of the first end member and the second end member by the driving force of the actuator, the first link moves less relative to the entire manipulator arm 1 (in other words, the travel distance of the first link relative to the entire manipulator arm can be smaller).

The manipulator arm according to various embodiments has an effect that the first cover and the second cover are less likely to slide against each other, whereby the manipulator arm can be easily used in a clean surgery area.

A manipulator arm 1 according to some embodiments is described with reference to FIGS. 1 to 9. The manipulator arm 1 corresponds to an arm portion in a master-slave type surgery assistance robot. The manipulator arm 1 may correspond to an arm portion in a surgery assistance robot other than the master-slave type. The manipulator arm 1 may correspond to an arm portion in a surgery assistance device other than the surgery assistance robot.

The manipulator arm 1 includes, as shown in FIG. 1, a first attachment portion 10, a second attachment portion 20 arranged to be spaced apart from the first attachment portion 10, and an arm portion 30 extending between the first attachment portion 10 and the second attachment portion 20.

In some embodiments, the first attachment portion 10 may have a configuration for attaching the manipulator arm 1 to a surgery assistance robot. The surgery assistance robot is not shown in FIGS. 1 to 9, according to various embodiments. In some embodiments, the first attachment portion 10 may have a configuration for connecting to a manipulator arm other than the manipulator arm 1. That is, in some embodiments, the first attachment portion 10 may connect the manipulator arm 1 to another manipulator arm provided on the surgery assistance robot.

Figure 2:
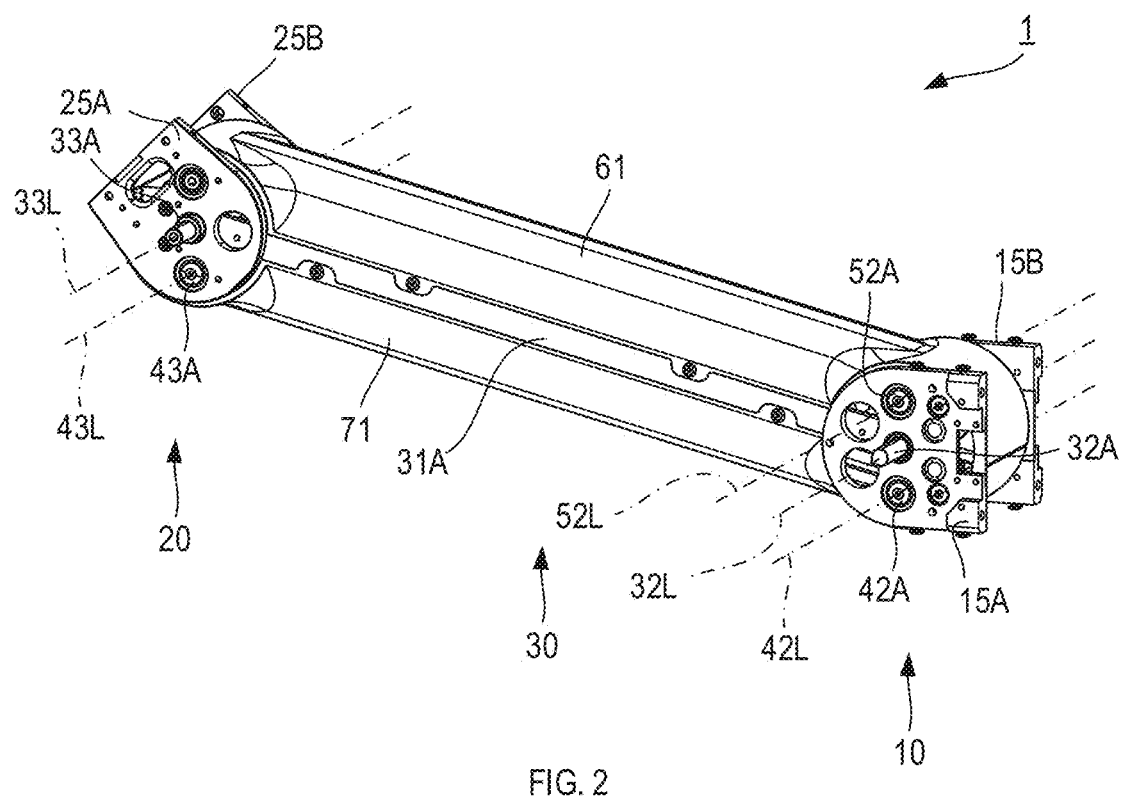
FIG. 2 is a perspective view illustrating a configuration of the manipulator arm of FIG. 1, according to some embodiments.

The first attachment portion 10 includes, as shown in FIG. 2, first end members 15A, 15B. The first attachment portion 10 further includes, as shown in FIG. 1, an attachment plate 11 used for installation onto the surgery assistance robot and first attachment covers 12A, 12B covering the first attachment portion 10. The first attachment cover 12A and the first attachment cover 12B have the same configuration. The first end member 15A and the first end member 15B have the same configuration.

The attachment plate 11 may be, as shown in FIG. 1, a circular plate-shaped member having a cylindrical or columnar projection in its center region. The attachment plate 11 is attached to the first end members 15A, 15B.

The first attachment cover 12A is a member covering the first end member 15A so as to conceal the first end member 15A from the exterior and has a cylindrical shape with a bottom surface. The first attachment cover 12A is attached to the first end member 15A with a cylindrical opening therein facing the first end member 15A.

The first attachment cover 12B is a member covering the first end member 15B so as to conceal the first end member 15B from the exterior and has a cylindrical shape with a bottom surface. The first attachment cover 12B is attached to the first end member 15B with a cylindrical opening therein facing the first end member 15B.

Figure 3:
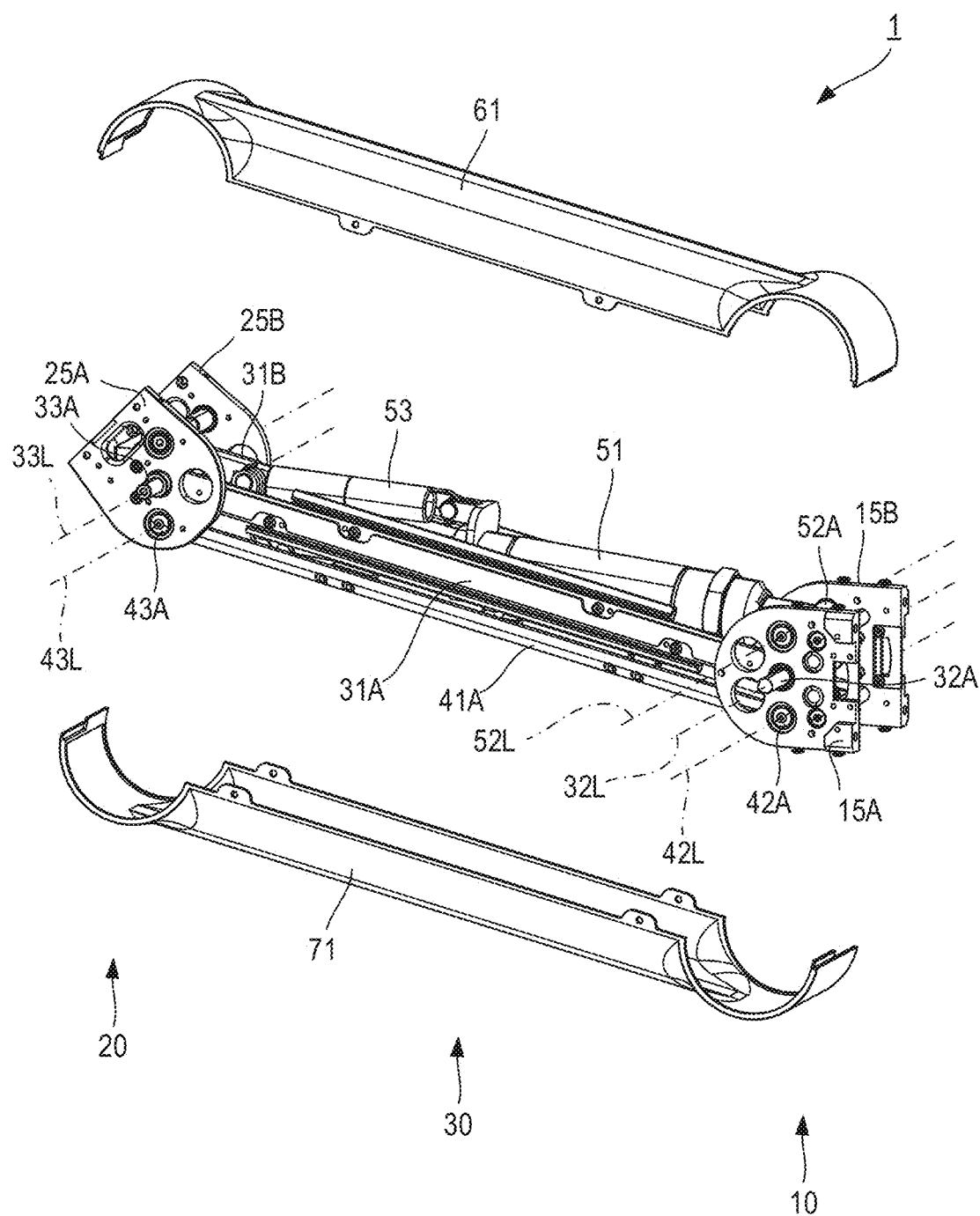
FIG. 3 is an exploded perspective view of the manipulator arm of FIG. 2.
Figure 4:
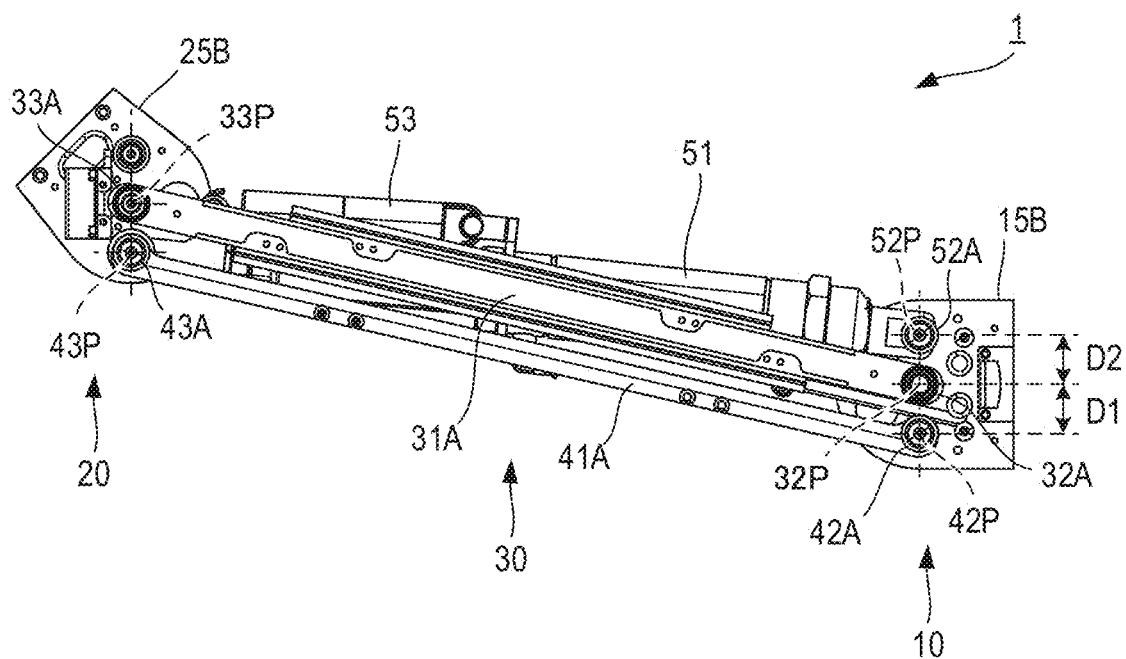
FIG. 4 illustrates an arrangement of a first link, a second link, and an actuator of the manipulator arm of FIG. 3, according to some embodiments.
Figure 5:
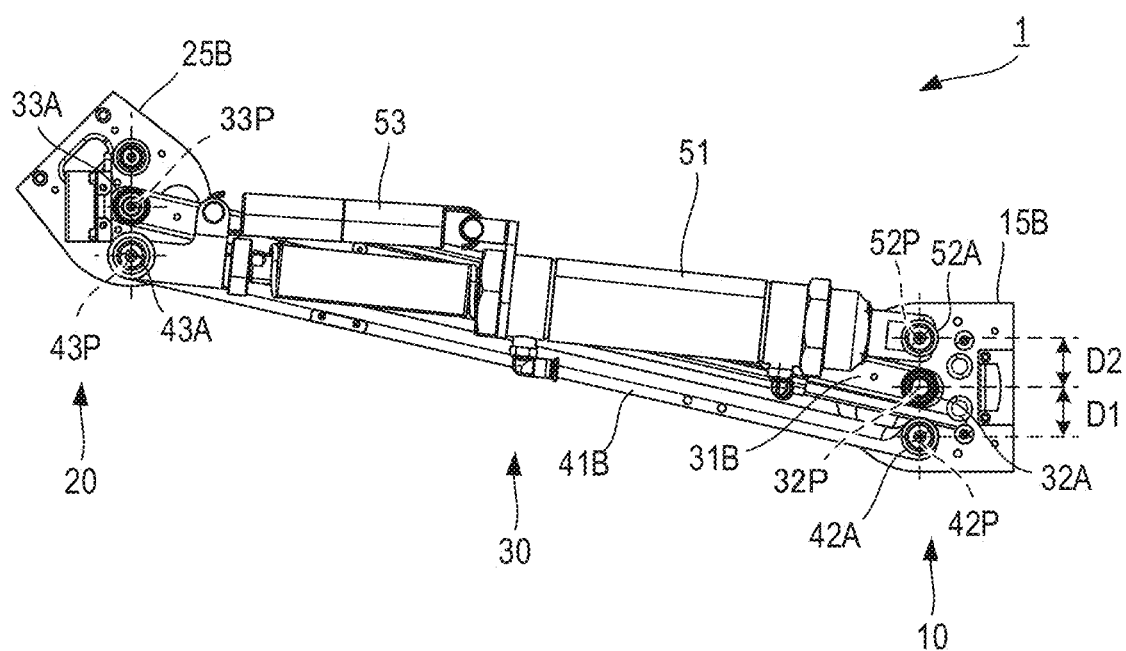
FIG. 5 illustrates an arrangement of a first link, a second link, and an actuator of the manipulator arm of FIG. 3, according to some embodiments.

The first end members 15A, 15B are, as shown in FIGS. 3, 4, 5 and the like, members forming parallel links together with second end members 25A, 25B, first links 31A, 31B, and second links 41A, 41B. Specifically, the first end member 15A, the second end member 25A, the first link 31A, and the second link 41A form one parallel link (e.g., a first parallel link), and the first end member 15B, the second end member 25B, the first link 31B, and the second link 41B form one parallel link (e.g., a second parallel link).

Each of the first end members 15A, 15B is a plate-shaped member having a substantially D-shaped outer shape. The attachment plate 11 is attached to the straight portions of the D-shapes of the first end members 15A, 15B. The first end members 15A, 15B are arranged with their curved portions of the D-shapes facing an arm portion 30 side. The first end members 15A, 15B are arranged side by side with portions of the first links 31A, 31B, the second links 41A, 41B and an actuator 51 interposed therebetween. The first end members 15A, 15B are fixed to each other in a state of being arranged side by side with a given space therebetween.

The second attachment portion 20 has a configuration for attaching another additional manipulator arm (not shown) to the manipulator arm 1. The second attachment portion 20 may have a configuration for attaching a device other than the manipulator arm to the manipulator arm 1, such as a device for holding an instrument to be used for surgery.

The second attachment portion 20 includes, as shown in FIG. 1, second attachment covers 22A, 22B covering the second attachment portion 20. The second attachment portion 20 includes, as shown in FIGS. 2 and 3 or the like, the second end members 25A, 25B. The second attachment cover 22A and the second attachment cover 22B have the same configuration. The second end member 25A and the second end member 25B have the same configuration.

As shown in FIG. 1, the second attachment cover 22A is a member covering the second end member 25A so as to conceal the second end member 25A from the exterior and has a cylindrical shape with a bottom surface. The second attachment cover 22A is attached to the second end member 25A with its cylindrical opening facing the second end member 25A.

The second attachment cover 22B is a member covering the second end member 25B so as to conceal the second end member 25B from the exterior and has a cylindrical shape with a bottom surface. The second attachment cover 22B is attached to the second end member 25B with a cylindrical opening therein facing the second end member 25B. The second end members 25A, 25B are, as shown in FIGS. 3, 4, 5 and the like, members forming the parallel links together with the first end members 15A, 15B, the first links 31A, 31B, and the second links 41A, 41B, respectively.

The second end members 25A, 25B are plate-shaped members having a substantially D-shaped outer shape. The second end members 25A, 25B are arranged with their curved portions of the D-shapes facing the arm portion 30 side. The second end members 25A, 25B are arranged side by side with portions of the first links 31A, 31B, the second links 41A, 41B and the actuator 51 interposed therebetween. The second end members 25A, 25B are fixed to each other in a state of being arranged side by side with a given space therebetween.

The arm portion 30 has a rod-like outer shape and has a configuration for being pivotally attached to each of the first attachment portion 10 and the second attachment portion 20. The arm portion 30 includes, as shown in FIGS. 3, 4 and 5, the first links 31A, 31B, the second links 41A, 41B, the actuator 51, a first cover 61 and a second cover 71.

The first links 31A, 31B are rod-like members arranged to extend between the first attachment portion 10 and the second attachment portion 20. Specifically, the first link 31A is a rod-like member arranged to extend between the first end members 15A, 15B and the second end members 25A, 25B. The first link 31B is a rod-like member arranged to extend between the first end members 15A, 15B and the second end members 25A, 25B. The first link 31A and the first link 31B have the same configuration. The first link 31A is arranged close to the first end member 15A and the second end member 25A. The first link 31B is arranged close to the first end member 15B and the second end member 25B. The first links 31A, 31B are members forming the parallel links together with the first end members 15A, 15B, the second end members 25A, 25B and the second links 41A, 41B, respectively.

A first end of the first link 31A on a first attachment portion 10 side is pivotally attached to the first end members 15A, 15B about a pivot axis 32L through a rotational shaft 32A. A first end of the first link 31B on the first attachment portion 10 side is pivotally attached to the first end members 15A, 15B about the pivot axis 32L through the rotational shaft 32A. The rotational shaft 32A is a cylindrical member arranged to extend at least between the first links 31A, 31B.

A central axis of the rotational shaft 32A is the pivot axis 32L. The pivot axis 32L passes through a position at or near a center of the curved portions of the D-shapes in the first end members 15A, 15B.

A second end of the first link 31A on a second attachment portion 20 side is pivotally attached to the second end members 25A, 25B about a pivot axis 33L through a rotational shaft 33A. A second end of the first link 31B on the second attachment portion 20 side is pivotally attached to the second end members 25A, 25B about the pivot axis 33L through the rotational shaft 33A. The rotational shaft 33A is a cylindrical member arranged to extend at least between the first links 31A, 31B. A central axis of the rotational shaft 33A is the pivot axis 33L. The pivot axis 33L passes through a position at or near a center of the curved portions of the D-shapes in the second end members 25A, 25B.

The first links 31A, 31B are arranged to be spaced apart from each other in a direction in which the pivot axis 32L and the pivot axis 33L extend. The first link 31A is arranged in parallel with the second link 41A with a space therebetween. The first link 31B is arranged in parallel with the second link 41B with a space therebetween.

The second links 41A, 41B are rod-like members arranged to extend between the first attachment portion 10 and the second attachment portion 20. Specifically, the second link 41A is a rod-like member arranged to extend between the first end members 15A, 15B and the second end members 25A, 25B. The second link 41B is a rod-like member arranged to extend between the first end members 15A, 15B and the second end members 25A, 25B. The second link 41A and the second link 41B have the same configuration. The second link 41A is arranged close to the first end member 15A and the second end member 25A. The second link 41B is arranged close to the first end member 15B and the second end member 25B. As shown in FIGS. 2, 3, and the like, the second links 41A, 42B form parallel links together with the first end members 15A, 15B, the second end members 25A, 25B, and the first links 31A, 31B, respectively.

A first end of the second link 41A on the first attachment portion 10 side is pivotally attached to the first end members 15A, 15B about a pivot axis 42L through a rotational shaft 42A. A first end of the second link 41B on the first attachment portion 10 side is pivotally attached to the first end members 15A, 15B about the pivot axis 42L through the rotational shaft 42A. The rotational shaft 42A is a cylindrical member arranged to extend between the second links 41A, 41B. A central axis of the rotational shaft 42A is the pivot axis 42L. The pivot axis 42L passes through a position spaced apart from the center of the curved portions of the D-shapes in the first end members 15A, 15B.

A second end of the second link 41A on the second attachment portion 20 side is pivotally attached to the second end members 25A, 25B about a pivot axis 43L through a rotational shaft 43A. A second end of the second link 41B on the second attachment portion 20 side is pivotally attached to the second end members 25A, 25B about the pivot axis 43L through the rotational shaft 43A. The rotational shaft 43A is a cylindrical member arranged to extend between the second links 41A, 41B. A central axis of the rotational shaft 43A is the pivot axis 43L. The pivot axis 43L passes through a position apart from the center of the curved portions of the D-shapes in the second end members 25A, 25B.

The second links 41A, 41B are arranged to be spaced apart from each other in a direction in which the pivot axis 42L and the pivot axis 43L extend. The second link 41A is arranged in parallel with the first link 31A with a space therebetween. The second link 41B is arranged in parallel with the first link 31B with a space therebetween.

The actuator 51 is a rod-like member arranged to extend between the first attachment portion 10 and the second attachment portion 20. The actuator 51 generates a driving force to move the parallel links respectively comprising the first end members 15A, 15B, the second end members 25A, 25B, the first links 31A, 31B, and the second link 41A, 42B. In other words, the actuator 51 generates a driving force to rotationally move the first end members 15A, 15B and the second end members 25A, 25B relative to each other.

In an embodiment, the actuator 51 may be driven by a pressurized gas supplied externally to the cylinder, thereby changing a longitudinal length of the actuator 51. In an embodiment, air may be used as the gas. In some embodiments, the actuator 51 may use gases other than air. In some embodiments, the actuator 51 may use a fluid other than gases.

The actuator 51 is provided with a spring 53 that generates a biasing force. The longitudinal length of the actuator 51 is controlled by the relationship between the biasing force of the spring 53 and the force generated in the cylinder that is externally supplied with gas. The magnitude of the force exerted by the actuator 51 on the parallel links may thus be controlled. In some embodiments, the spring 53 may be omitted.

A first end of the actuator 51 on a first end member 15A, 15B side is pivotally attached to the first end members 15A, 15B about a pivot axis 52L through a rotational shaft 52A. A central axis of the rotational shaft 52A is the pivot axis 52L.

The first end of the actuator 51 on the first end members 15A, 15B side is, as shown in FIGS. 4 and 5, attached at a position 52P that sandwiches, between the position 52P and a position 42P where the second links 41A, 41B are attached in the first end members 15A, 15B, a position 32P where the first links 31A, 31B are attached. In other words, the position 32P to which the first links 31A, 31B are attached to the first end members 15A, 15B is located between the position 52P to which the first end of the actuator 51 is attached to the first end members 15A, 15B and the position 42P to which the first end of the second links 41A, 41B are attached to the first end members 15A, 15B. Note that the first end member 15A is not shown in FIGS. 4 and 5 for clarity.

The position 32P is a position through which the pivot axis 32L passes in the first end members 15A, 15B. The position 32P is also a center position of the rotational shaft 32A and a center position of the relative rotational movement of the first end members 15A, 15B and the arm portion 30. The position 42P is a position through which the pivot axis 42L passes in the first end members 15A, 15B. The position 52P is also a position through which the rotational shaft 52A passes and the pivot axis 52L passes in the first end members 15A, 15B.

A second end of the actuator 51 on the second end members 25A, 25B side is pivotally attached to the second end members 25A, 25B about the pivot axis 43L through the rotational shaft 43A. The second end of the actuator 51 on the second end members 25A, 25B side is attached at a position 43P where the second links 41A, 41B are attached in the second end members 25A, 25B. The position 43P is a position through which the pivot axis 43L passes in the second end members 25A, 25B.

A position 33P where the first links 31A, 31B are attached in the second end members 25A, 25B is a position through which a pivot axis 33L passes. The position 33P is also a center position of the rotational shaft 33A and a center position of the relative rotational movement of the second end members 25A, 25B and the arm portion 30.

As shown in FIGS. 4 and 5, in some embodiments, the position 32P, the position 42P, and the position 52P are aligned side by side on a same straight line. As shown in FIGS. 4, 5 and the like, for example, a first distance D1 from the position 32P to the position 42P may be equal to a second distance D2 from the position 32P to the position 52P. However, this is only an example and, in some embodiments, the position 32P, the position 42P and the position 52P are not necessarily aligned side by side on the same straight line. It is advantageous that the first distance D1 is equal to the second distance D2. However, in some embodiments, the first distance D1 and the second distance D2 may have different lengths as along as a movement of the manipulator arm 1 described with respect to FIGS. 6-9 may be maintained.

The first cover 61 and the second cover 71 are members forming the outer shape of the arm portion 30, as shown in FIG. 3, and cover at least the second link 41 and the actuator 51. The first cover 61 and the second cover 71, together with the first links 31A, 31B, form a space for accommodating at least the second link 41 and the actuator 51.

The first cover 61 is a member placed on the first links 31A, 31B and positioned opposite the second links 41A, 411B with respect to the first links 31A, 31B. A first end of the first cover 61 on the first end member 15A, 15B side has a semi-cylindrical shape with the pivot axis 32L as the center. A second end on the second end member 25A, 25B side has a semi-cylindrical shape with the pivot axis 33L as the center. A longitudinal central region of the first cover 61 is formed into a half-pipe shape with a central axis thereof extending from the first attachment portion 10 toward the second attachment portion 20 on an actuator 51 side.

The second cover 71 is a member placed on the first links 31, 31B and positioned on a second link 41A, 41B side of the first links 31A, 31B. A first end of the second cover 71 on the first end member 15A, 15B side has a semi-cylindrical shape with the pivot axis 32L as the center. A second end on the second end member 25A, 25B side has a semi-cylindrical shape with the pivot axis 33L as the center. A longitudinal central region of the second cover 71 is formed into a half-pipe shape with a central axis thereof extending from the first attachment portion 10 toward the second attachment portion 20 on the actuator 51 side.

Next, the movement of the manipulator arm 1 is described with reference to FIGS. 6 to 9, according to various embodiments. First, the movement when the longitudinal dimension of the actuator 51 is shortened is described with reference to FIGS. 6 and 7. In other words, the movement when the actuator 51 is retracted is described with reference to FIGS. 6 and 7.

Figure 6:
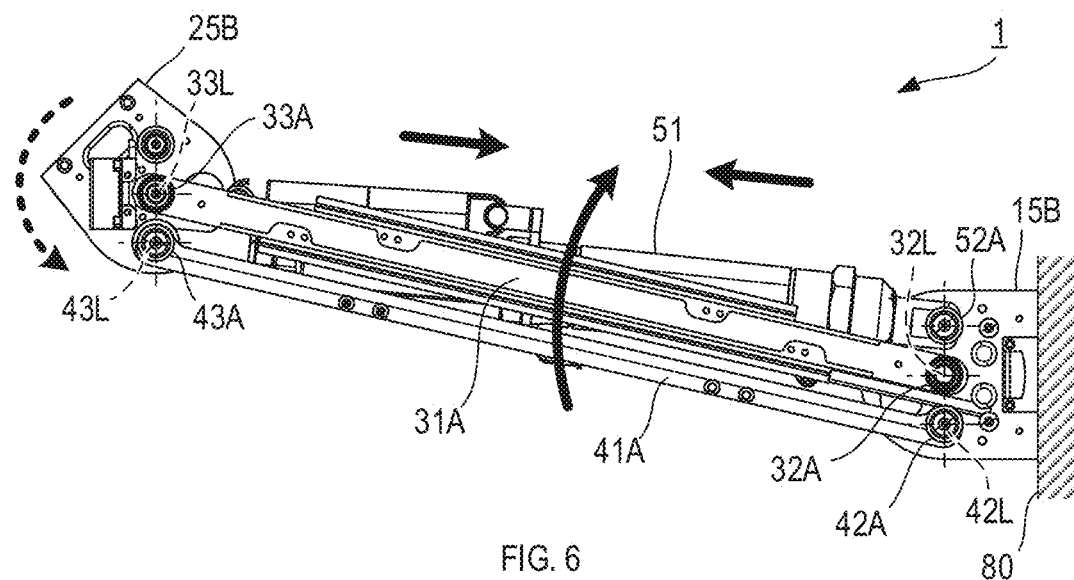
FIG. 6 illustrates a movement of a manipulator arm when an actuator is retracted, according to some embodiments.

FIG. 6 shows the movement of the manipulator arm 1 in the state where the first end members 15A, 15B are fixed to a fixed portion 80 of the surgery assistance robot, according to an embodiment. In other words, FIG. 6 shows the movement of the manipulator arm 1 in the state where the attachment plate 11 shown in FIG. 1 is fixed to the fixed portion 80 of the surgery assistance robot. In FIG. 6, the first end member 15A, the second end member 25A, and the second link 41B are not shown for ease of description and clarity.

When the longitudinal dimension of the actuator 51 is shortened, as shown in FIG. 6, the distance between the rotational shaft 52A and the rotational shaft 43A is shortened. The first links 31A, 31B move rotationally about the rotational shaft 32A with respect to the first end members 15A, 15B. In other words, the first links 31A, 31B move rotationally to the right (also referred to as "clockwise") about the pivot axis 32L in FIG. 6. The second link 41 moves rotationally about the rotational shaft 42A with respect to the first end member 15. In other words, the second link 41 moves rotationally to the right (clockwise) about the pivot axis 32L in FIG. 6.

The second end members 25A, 25B move upward in FIG. 6 with the rotational movement of the first links 31A, 31B and the second links 41A, 41B. In other words, the second end members 25A, 25B rotate clockwise about the pivot axis 32L in FIG. 6. In addition, the second end members 25A, 25B move rotationally about the rotational shaft 33A. In other words, the second end members 25A, 25B rotate to the left (also referred to as "counterclockwise") about the pivot axis 33L in FIG. 6. The second end members 25A, 25B maintain postures relative to the first end members 15A, 15B while changing positions relative to the first end members 15A, 15B.

Figure 7:
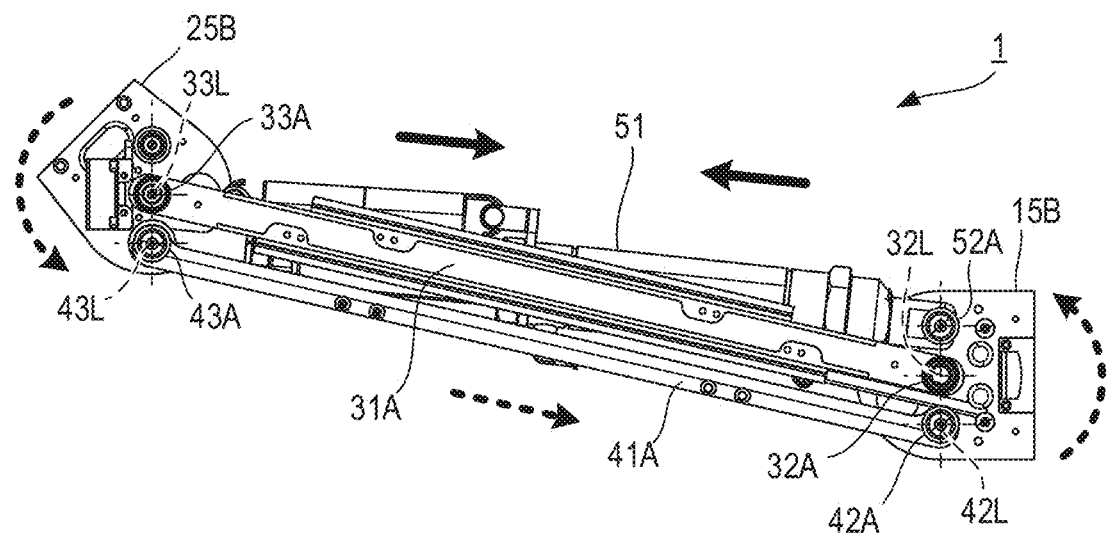
FIG. 7 illustrates a relative movement of a first end member and a second end member of the manipulator arm of FIG. 6, according to some embodiments.

FIG. 7 shows a relative movement between the first end members 15A, 15B and the second end members 25A, 25B when the longitudinal dimension of the actuator 51 is shortened, according to an embodiment. The movement of the manipulator arm 1 is the same as that shown in FIG. 6. Here, the description focuses on the relative movement between the first end members 15A, 15B and the second end members 25A, 25B. In FIG. 7, the first end member 15A, the second end member 25A, and the second link 41B are not shown for ease of description and clarity.

When the longitudinal dimension of the actuator 51 is shortened, as shown in FIG. 7, the distance between the rotational shaft 52A and the rotational shaft 43A is shortened. The first end members 15A, 15B move rotationally about the rotational shaft 32A. In other words, the first end members 15A, 15B rotate to the left (counterclockwise) about the pivot axis 32L in FIG. 7.

The second end members 25A, 25B move rotationally about the rotational shaft 33A. In other words, the second end members 25A, 25B rotate to the left (counterclockwise) about the pivot axis 33L in FIG. 6. The second link 41A moves toward the first end members 15A, 15B relative to the first link 31A with the rotation of the first end members 15A, 15B and the second end members 25A, 25B. The second link 41B moves toward the first end members 15A, 15B relative to the first link 31B with the rotation of the first end members 15A, 15B and the second end members 25A, 25B.

Figure 8:
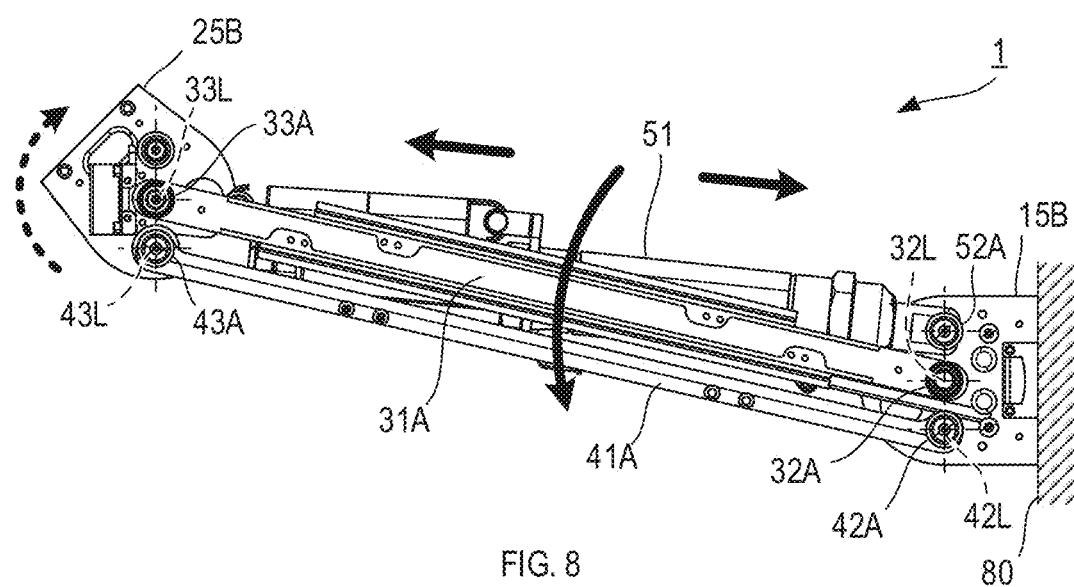
FIG. 8 illustrates a movement of a manipulator arm when an actuator is extended, according to some embodiments.

Next, the movement when the longitudinal dimension of the actuator 51 is lengthened is described with reference to FIGS. 8 and 9, according to various embodiments. In other words, the movement when the actuator 51 is extended is described with reference to FIGS. 8 and 9. FIG. 8 shows the movement of the manipulator arm 1 in the state where the first end members 15A, 15B are fixed to the fixed portion 80 of the surgery assistance robot, according to an embodiment. In other words, FIG. 8 shows the movement of the manipulator arm 1 in the state where the attachment plate 11 shown in FIG. 1 is fixed to the fixed portion 80 of the surgery assistance robot. In FIG. 8, the first end member 15A, the second end member 25A, and the second link 41B are not shown for ease of description and clarity.

When the longitudinal dimension of the actuator 51 is lengthened, as shown in FIG. 8, the distance between the rotational shaft 52A and the rotational shaft 43A is lengthened. The first links 31A, 31B move rotationally about the rotational shaft 32A with respect to the first end members 15A, 15B. In other words, the first links 31A, 31B move rotationally counterclockwise about the pivot axis 32L in FIG. 8. The second links 41A, 41B move rotationally about the rotational shaft 42A with respect to the first end members 15A, 15B. In other words, the second links 41A, 41B move rotationally counterclockwise about the pivot axis 32L in FIG. 8.

The second end members 25A, 25B move downward in FIG. 8 with the rotational movement of the first link 31 and the second link 41. In other words, the second end members 25A, 25B rotate to the left (counterclockwise) about the pivot axis 32L in FIG. 8. In addition, the second end members 25A, 25B move rotationally about the rotational shaft 33A. In other words, the second end members 25A, 25B rotate to the right (clockwise) about the pivot axis 33L in FIG. 8. The second end members 25A, 25B maintain postures relative to the first end members 15A, 15B while changing positions relative to the first end members 15A, 15B.

Figure 9:
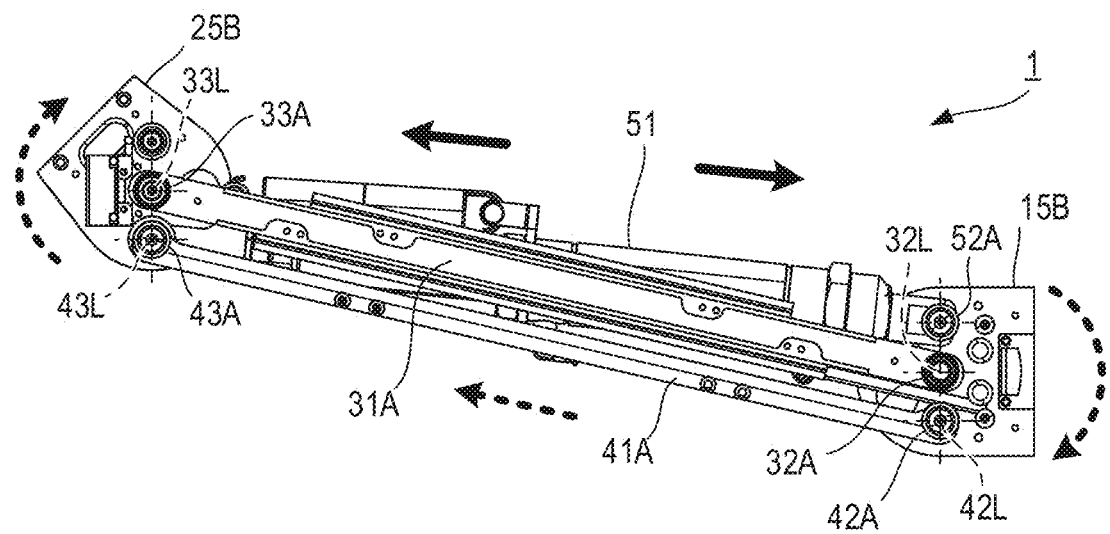
FIG. 9 illustrates a relative movement of a first end member and a second end member of the manipulator arm of FIG. 8, according to some embodiments.

FIG. 9 shows a relative movement between the first end members 15A, 15B and the second end members 25A, 25B when the longitudinal dimension of the actuator 51 is lengthened, according to an embodiment. The movement of the manipulator arm 1 is the same as that shown in FIG. 8. Here, the description focuses on the relative movement between the first end members 15A, 15B and the second end members 25A, 25B. In FIG. 9, the first end member 15A, the second end member 25A, and the second link 41B are not shown for ease of description and clarity.

When the longitudinal dimension of the actuator 51 is lengthened, as shown in FIG. 9, the distance between the rotational shaft 52A and the rotational shaft 43A is lengthened. The first end members 15A, 15B move rotationally about the rotational shaft 32A. In other words, the first end members 15A, 15B rotate to the right (clockwise) about the pivot axis 32L in FIG. 9.

The second end members 25A, 25B move rotationally about the rotational shaft 33A. In other words, the second end members 25A, 25B rotate to the right (clockwise) about the pivot axis 33L in FIG. 9. The second link 41A moves toward the second end members 25A, 25B relative to the first link 31A with the rotation of the first end members 15A, 15B and the second end members 25A, 25B. The second link 41B moves toward the second end members 25A, 25B relative to the first link 31B with the rotation of the first end members 15A, 15B and the second end members 25A, 25B.

In the manipulator arm 1, the first cover 61 and the second cover 71 are placed on the same first links 31A, 31B, and thus, the first cover 61 and the second cover 71 do not slide against each other when the parallel links move. Here, placing the first cover 61 and the second cover 71 on the same first links 31A, 31B means, as can be seen with reference to FIGS. 1 to 9, that the first cover 61 and the second cover 71 are attached to the first links 31A, 31B. This configuration reduces a possibility of generating foreign matter by the first cover 61 and the second cover 71 sliding against each other, and the manipulator arm 1 can be easily used in a clean surgical area.

The first cover 61 and the second cover 71 are placed on the first links 31A, 31B, which reduces the formation of a gap between the first cover 61 and the second cover 71. In other words, it is easy to reduce the gap. Even if a gap is formed between the first cover 61 and the second cover 71, the first links 31, 31B are present in the gap. That is, the gap can be covered by the first links 31, 31B. This configuration reduces the release of the foreign matter from the interior to the exterior of the first cover 61 and the second cover 71 and the manipulator arm 1 can be easily used in a clean surgery area.

The position where the first links 31A, 31B are attached to the first end members 15A, 15B is sandwiched between the position where the actuator 51 is attached and the position where the second links 41A, 41B are attached. The position where the actuator 51 is attached to the second end members 25A, 25B is the position where the second link 41 is attached.

Therefore, when the parallel links move, a movement distance of the first links 31A, 31B is shorter than a movement distance of the second links 41A, 41B. Thus, a movement distance of the first cover 61 and the second cover 71, which are placed on the first links 31A, 31B, is shorter than a case where, for example, the second cover 71 is placed on the second links 41A, 41B. Compared with the case where the second cover 71 is placed on the second links 41A, 41B, the movement distance of the first cover 61 and the second cover 71 with respect to the entire manipulator arm 1 is shortened, and the first cover 61 and the second cover 71 are less likely to slide against other components. The possibility of generating foreign matter from the first cover 61 and the second cover 71 may be reduced, and the manipulator arm 1 can be easily used in a clean surgery area.

Since the first links 31A, 31B are attached at the rotation centers of the first end members 15A, 15B and the second end members 25A, 25B, it is possible to easily control the movement of the first links 31A, 31B even when the parallel links move. In other words, even when the second links 41A, 41B move with the rotational movement of the first end members 15A, 15B and the second end members 25A, 25B, the first links 31A, 31B move less relative to the entire manipulator arm 1 (in other words, the travel distance of the first links relative to the entire manipulator arm can be smaller). Thus, the possibility of generating foreign matter from the first cover 61 and the second cover 71 would be reduced, and the manipulator arm 1 can be easily used in a clean surgery area.

Since the first distance D1 is equal to the second distance D2, the movement of the first links 31A, 31B is easily controlled even when the parallel links are moved by the driving force of the actuator 51. In other words, even when the second links 41A, 41B move with the rotational movement of the first end members 15A, 15B and the second end members 25A, 25B by the driving force of the actuator 51, the first links 31A, 31B move less relative to the entire manipulator arm 1 (in other words, the travel distance of the first links relative to the entire manipulator arm can be smaller). Thus, the possibility of generating foreign matter from the first cover 61 and the second cover 71 would be reduced, and the manipulator arm 1 can be easily used in a clean surgery area.

While various embodiments have been described above with reference to the drawings, various changes and modifications may be made to the various embodiments, and it will be understood that such various changes and modifications in form and details may be made without departing from the spirit and scope of the appended claims.

What is claims is:

1. A manipulator arm comprising:
a parallel link including a first end member and a second end member arranged to be spaced apart from each other, and a first link and a second link that are arranged to extend between the first end member and the second end member and that are arranged side by side with a space therebetween;

an actuator that is arranged to extend between the first end member and the second end member and that is configured to change a longitudinal length thereof to generate a driving force to rotationally move the first end member and the second end member relative to each other, wherein a first position where the actuator is attached to the first end member is a position that sandwiches, between the first position and a position where the second link is attached, a position where the first link is attached, and wherein a second position where the actuator is attached to the second end member is a position that is a same position as a position where the second link is attached;

a first cover placed on the first link from a side opposite the second link with respect to the first link, the first cover covering at least the actuator; and a second cover placed on the first link from a second link side with respect to the first link, the second cover covering at least the second link and the actuator.

2. The manipulator arm according to claim 1,
wherein a first end of the first link is attached at a rotation center of the first end member, and a second end of the first link is attached at a rotation center of the second end member.

3. The manipulator arm according to claim 2,
wherein a first distance from the position where the first link is attached to the position where the second link is attached in the first end member is equal to a second distance from the position where the first link is attached to the position where the actuator is attached in the first end member.

4. The manipulator arm according to claim 1,
wherein a first distance from the position where the first link is attached to the position where the second link is attached in the first end member is equal to a second distance from the position where the first link is attached to the position where the actuator is attached in the first end member.

5. A manipulator arm comprising:
a parallel link including a first end member and a second end member spaced apart from the first end member, and a first link attached to the first end member at a first position and to the second end member at a second position, and a second link attached to the first end member at a first position and attached to the second end member at a second position, the first link being parallel to the second link;

an actuator attached to the first end member at a first actuator position and attached to the second end member at a second actuator position, wherein the first position of the first link is located between the first actuator position and the first position of the second link, and wherein the second actuator position is a same position as the second position of the second link;

a first cover on the first link and covering at least the actuator; and a second cover on the first link and covering at least the second link and the actuator.

6. The manipulator arm according to claim 5, wherein the actuator is configured to rotationally move the first end member relative to the second end member.

7. The manipulator arm according to claim 5,
wherein a first end of the first link is attached at a rotation center of the first end member, and a second end of the first link is attached at a rotation center of the second end member.

8. The manipulator arm according to claim 7,
wherein a first distance from the first position of the first link to the first position of the second link is equal to a second distance from the first position of the first link to the first actuator position.

9. The manipulator arm according to claim 5,
wherein a first distance from the first position of the first link to the first position of the second link is equal to a second distance from the first position of the first link to the first actuator position.

10. A manipulator arm comprising:
two parallel links, each of the two parallel links including:
a first end member and a second end member spaced apart from the first end member,
a first link between the first end member and the second end member, and
a second link between the first end member and the second end member, the first link being parallel to the second link;
an actuator attached to a first actuator shaft extending through the first end members of the two parallel links and to a second actuator shaft extending through the second end members of the two parallel links;
a first cover between the two parallel links and on the first links, the first cover covering at least the actuator; and
a second cover between the two parallel links and on the first links, the second cover covering at least the second links and the actuator,
wherein the first links are attached to a first link shaft extending through the first end members of the two parallel links and to a second link shaft extending through the second end members of the two parallel links,
wherein the second links are attached to a third link shaft extending through the first end members of the two parallel links and to the second actuator shaft, and
wherein the first link shaft is located between the first actuator shaft and the third link shaft.

11. The manipulator arm according to claim 10, wherein the actuator is configured to rotationally move the first end members relative to the second end members.

12. The manipulator arm according to claim 11,
wherein a first distance from the first link shaft to the third link shaft is equal to a second distance from the first actuator shaft to the first link shaft.

13. The manipulator arm according to claim 10,
wherein a first distance from the first link shaft to the third link shaft is equal to a second distance from the first actuator shaft to the first link shaft.

* * * * *